US008770394B2

(12) United States Patent
Huels et al.

(10) Patent No.: US 8,770,394 B2
(45) Date of Patent: Jul. 8, 2014

(54) STEEL CORD CONVEYOR BELT HAVING A CONNECTING HINGE FOR COUPLING TWO BELT ENDS

(71) Applicant: ContiTech Transportbandsysteme GmbH, Hannover (DE)

(72) Inventors: Achim Huels, Barsinghausen (DE); Michael Moeschen-Siekmann, Noerten-Hardenberg (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 13/849,326

(22) Filed: Mar. 22, 2013

(65) Prior Publication Data
US 2013/0213774 A1 Aug. 22, 2013

Related U.S. Application Data

(63) Continuation of application No. PCT/EP2011/064007, filed on Aug. 15, 2011.

(30) Foreign Application Priority Data

Sep. 22, 2010 (DE) .......................... 10 2010 037 697

(51) Int. Cl.
B65G 17/00 (2006.01)
F16G 3/00 (2006.01)
(52) U.S. Cl.
CPC .......................................... F16G 3/00 (2013.01)
USPC ....................................................... 198/844.2
(58) Field of Classification Search
USPC ............ 198/844.1, 844.2, 847; 474/202–272; 24/31 R, 31 B, 31 C, 31 F, 31 L, 31 H, 24/31 W, 31 V, 33 R, 33 A, 33 F, 33 P, 33 V, 24/33 L, 33 B, 33 C, 33 K, 33 M
See application file for complete search history.

(56) References Cited

U.S. PATENT DOCUMENTS 2,496,695 A * 2/1950 Brunner ....................... 24/31 W
3,105,390 A * 10/1963 Hans-Holger et al. ........ 474/205
3,131,077 A 4/1964 Barnby et al.

(Continued)

FOREIGN PATENT DOCUMENTS

DE 2 357 994 A1 6/1974
DE 24 53 463 A1 5/1976
GB 902 200 A 7/1962

OTHER PUBLICATIONS

International Search Report dated Dec. 6, 2011 of international application PCT/EP2011/064007 on which this application is based.

Primary Examiner — William R Harp
(74) Attorney, Agent, or Firm — Walter Ottesen P.A.

(57) ABSTRACT

A conveyor belt includes first and second conveyor belt portions and each one of the conveyor belt portions includes top and bottom layers made of elastomer material. A reinforcement layer is sandwiched between the top and bottom layers and includes mutually parallel steel cords. Each conveyor belt portion further includes an end section whereat the top and bottom layers are removed to expose the steel cords. First and second part hinges are assigned to respective ones of the end sections and each includes a hinge plate having bores to accommodate the exposed steel cords. The hinge plates are pressed to fix the cords securely in position. The part hinges each include a plurality of crenellated projections at a free end thereof. The part hinges are assembleable to conjointly define a hinge connecting the first and second connecting belt portions to each other.

9 Claims, 3 Drawing Sheets

(56) References Cited

U.S. PATENT DOCUMENTS

| | | | |
|---|---|---|---|
| 3,300,029 A * | 1/1967 | Jenkins | 198/728 |
| 3,327,359 A * | 6/1967 | Hans-Holger | 24/37 |
| 4,912,812 A | 4/1990 | Henn et al. | |
| 5,246,101 A | 9/1993 | Flebbe | |
| 6,896,125 B2 * | 5/2005 | Webster et al. | 198/844.2 |
| 8,365,906 B2 * | 2/2013 | Moeschen-Siekmann et al. | 198/844.2 |
| 2010/0029426 A1 | 2/2010 | Pons Sanchez | |

* cited by examiner

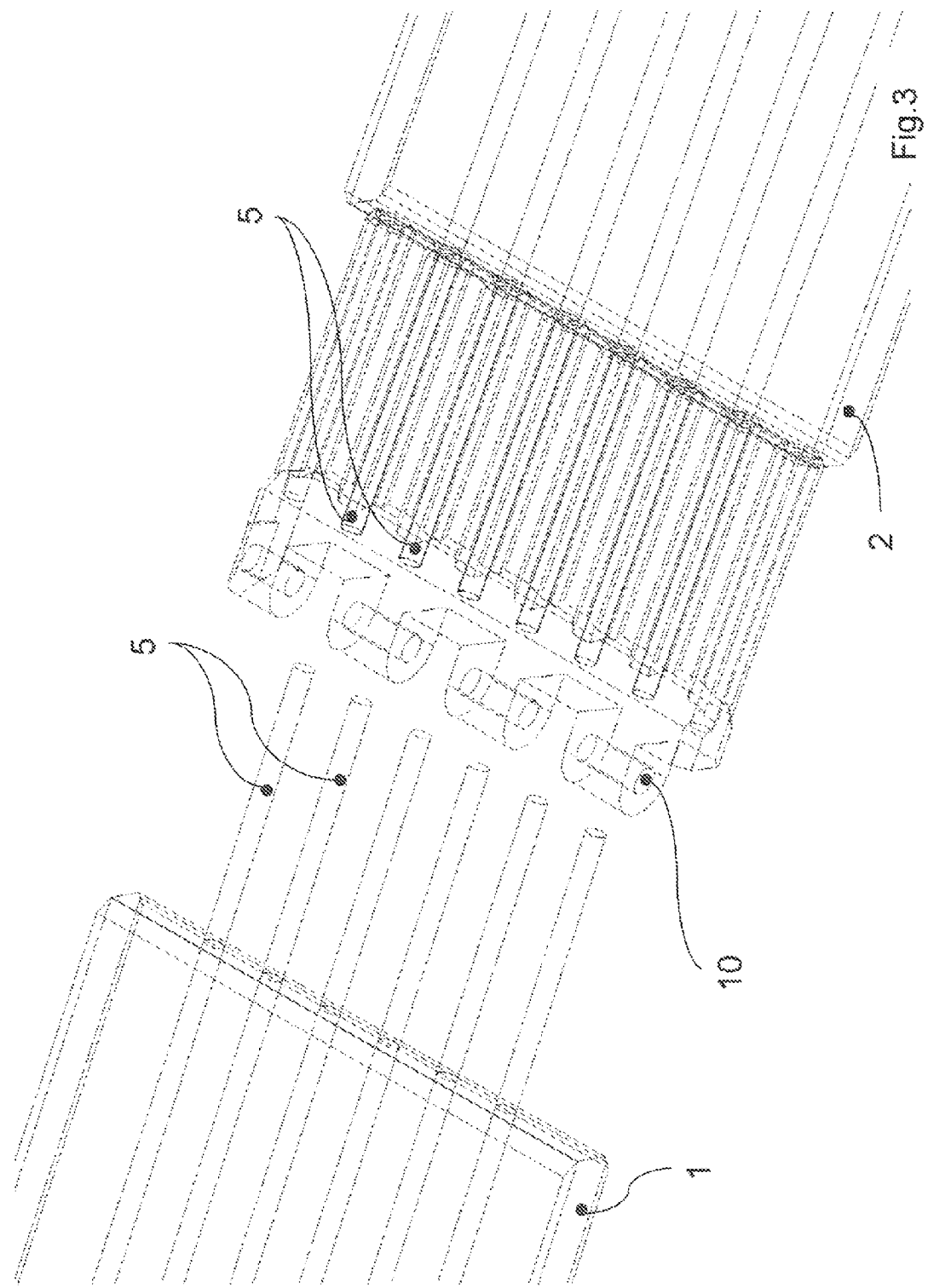

STEEL CORD CONVEYOR BELT HAVING A CONNECTING HINGE FOR COUPLING TWO BELT ENDS

CROSS REFERENCE TO RELATED APPLICATIONS

This application is a continuation application of international patent application PCT/EP2011/064007, filed Aug. 15, 2011, designating the United States and claiming priority from German application 10 2010 037 697.3, filed Sep. 22, 2010, and the entire content of both applications is incorporated herein by reference.

FIELD OF THE INVENTION

The invention relates to a conveyer belt or conveyer belt segment of elastomeric material with a reinforcing support layer of steel cords which run in the longitudinal direction of the conveyer belt and are arranged parallel to one another. Each belt or segment end is configured for hinge-like coupling together to another belt or segment end.

BACKGROUND OF THE INVENTION

It is known to join conveyer belts of elastomeric material continuously by the two ends of the conveyer belt being joined in the end regions after specific finishing of the rubber covering layers and by said ends being connected non-detachably to each other by vulcanization.

This is standard practice particularly in the case of steel cord conveyer belts and is used even following damage and subsequent repair of a steel cord conveyer belt. After the belt ends are overlapped and the exposed steel cord end sections placed one inside another and after rubber covering plates are placed on a steel cord belt connection is produced by vulcanization. The outlay on apparatus and time for producing a steel cord belt connection of this type is high. The production process or conveying process is interrupted during this time.

In order to achieve at least an emergency operation of the conveyer system, it is known from U.S. Pat. No. 5,246,101 to expose some steel cord ends at both broken ends of the belt and to couple these ends frictionally to a separate coupling piece of firm material. However, this connection should be regarded merely as a short-term connection for an urgently-required conveyer system within the context of an emergency connection having reduced load-bearing capacity. After a possible shutdown of the conveyer system, the conveyer belt is customarily closed again continuously by vulcanization of the two ends thereof.

For certain conveyer belts, endless connections or end connections by mechanical connecting devices are also known. In this case, the particular belt end has a mechanical connecting part which is releasably coupled to the connecting part of the other belt end in each case. One such releasable connecting form is the hinge form. In this case, the belt ends each have a part hinge which is joined together in a complementary manner to the part hinge of the upper belt end in each case and is connected in a tension-proof manner thereto by a coupling rod guided through the crenellation-type, intermeshing hinge loops.

These releasable connections are used particularly for conveyer belts which can be fitted only with a large outlay or which have to be more frequently exchanged, shortened or lengthened during operation. These hinge connections are predominantly used in the case of fiber-reinforced conveyer belts. In the case of steel cord conveyer belts, the hinge-like connections have not been able to gain acceptance, since the tension-proof connection of the hinge parts to the belt ends constitutes an unresolved problem.

It is known from GB 902,200 to provide conveyer belt segments with a cord insert made of steel wires. The wire cord insert consists of a narrow rubber band which is laid helically over the width of the belt and receives some wires in the vulcanizable rubber mixture thereof, which is rolled out to form the band, lying next to one another in parallel in a horizontal plane. At each segment end, the rubber band is shaped by being laterally offset twice in each case to form a plurality of loops. When returning from each loop, the rubber band again undergoes a lateral offset and runs laterally next to the band supply in the same horizontal plane. The rubber band thereby forms a plurality of spaced-apart, rubberized loops lying in one plane at both ends of the conveyer belt segment. The steel wires are deflected from the direction thereof, running in the belt segment, to the loop region and from the latter. The loops which are formed lie at a distance from one another in the form of crenellations. Complementary, rubberized loops of the belt end of another conveyer belt segment can engage in the intermediate spaces formed in this manner. The two rows of loops are coupled to one another in a hinge-like manner by means of a coupling rod.

The steel wires shaped to form the loop have to be very sharply deflected. This leads to a significant reduction in the permissible tensile loading and to a risk of the steel wires breaking. It is apparent that only very thin steel wires can be deformed in this way at all. This construction is unsuitable for steel cord conveyer belts which transmit large forces and have relatively rigid steel cords. In addition, the thickness of the entire belt cross section is inevitably increased in the region of the belt end by the construction, which is disadvantageous when the entire conveyer belt circulates in the conveyer system.

SUMMARY OF THE INVENTION

It is an object of the invention to provide a hinge connection even for steel cord conveyer belts or steel cord conveyer belt segments having average and larger cord diameters with this hinge connection being tension-proof and being produced with reduced complexity.

The conveyor belt of the invention defines a longitudinal axis and includes: first and second conveyor belt portions; each one of the conveyor belt portions including top and bottom layers made of elastomer material; a reinforcement layer sandwiched between the top and bottom layers; the reinforcement layer including a plurality of steel cords arranged to be mutually parallel and running in the direction of the longitudinal axis; each of the conveyor belt portions further including an end section whereat the top and bottom layers are removed so as to cause the steel cords to be exposed providing a plurality of exposed steel cord end segments; first and second part hinges assigned to respective ones of the end sections of the conveyor belt portions; each one of the part hinges including a hinge plate having a plurality of longitudinal bores formed therein to accommodate respective ones of the cord end segments inserted therein; the hinge plate of each of the part hinges being pressed to fix the cord end segments securely in position in the hinge plate; the hinge plate of each of the part hinges having a free end; each one of the first and second part hinges further including a plurality of crenellated projections at the free end of the hinge plate corresponding thereto; and, the part hinge corresponding to the first conveyor belt portion being assembleable with the part hinge corresponding to the second conveyor belt portion to conjointly define a hinge connecting the first and second conveyor belt portions to each other.

The hinge plates are preferably manufactured from metal and act as a pressed, part through which a frictional and form-fitting connection directly between the hinge plate and the steel cords is produced.

The hinge plates contain longitudinal bores in the direction of the steel cords of the belt. In order to produce the connection between a belt end and a hinge plate, the steel cords are exposed over the length of the designated connection and fitted into the longitudinal bores of the hinge plate. That region of the hinge plate in which the steel cords are introduced is pressed together by means of a press. A frictional and partially form-fitting connection is produced between the hinge plate and the inserted steel cords.

Each of the two part hinges of the hinge connection is formed as a single part, which considerably facilitates the installation.

The invention enables the steel cord layer arranged in the longitudinal direction of the belt to run without being deflected. A complicated vulcanization of the belt ends to each other is no longer necessary.

The invention provides a hinge connection of the belt ends of a conveyer belt or conveyer belt segments, by means of which hinge connection transmission of the tensile forces permitted for the particular steel cord belt is ensured. The construction parts of the particular part hinge are located substantially within the belt cross section.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
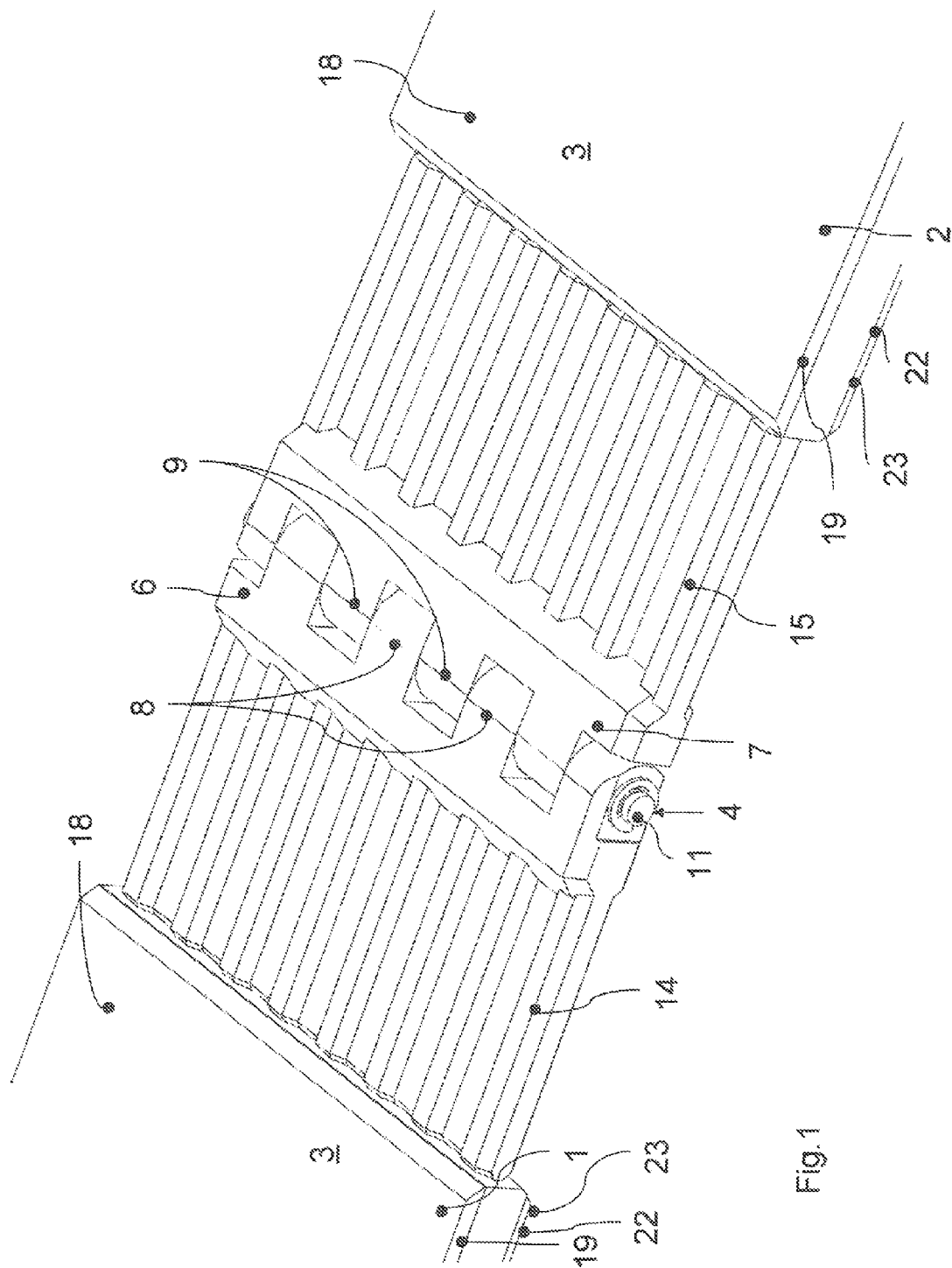
FIG. 1 shows a closed hinge connection, of two ends of a steel cord conveyer belt.

Two ends 1 and 2 of a steel cord conveyer belt 3 are connected to each other in a tension-tight manner via a hinge 4 (FIG. 1). The steel cord conveyer bait 3 is constructed in a manner known per se from elastomeric material and has an embedded reinforcement layer of steel cables or steel cords 5 arranged in parallel. To illustrate this embedding, the belt ends (1, 2) are illustrated in a transparent section in FIG. 3.

The hinge 4 consists of two part hinges 6 and 7, the crenellation-type projections 8 and 9 of which intermesh in such a manner that the transverse bores 10 arranged in the projections 8 and 9 are aligned with each other, and therefore a coupling rod 11 can be introduced through the transverse bores 10 in order to complete the hinge 4. Each part hinge 6 or 7 has a hinge bolt 12 or 13 bearing the crenellation-type projections (8, 9), and on which respective offset hinge plates 14 and 15 are integrally formed in a manner facing away from the hinge. Each part hinge 6 and 7 is formed as a single part.

Only one hinge side is described below. This description also applies similarly to the other hinge side. The part hinges 6 and 7 are of structurally identical design.

The top rubber covering layer 18, the bottom rubber covering layer 22 and the core rubber layer into which the steel cords 5 are embedded are removed in the end region of the belt end 2. The ends of the steel cords 5 are therefore uncovered in the end region, that is, these ends are exposed. FIG. 1 further shows that top rubber covering layer 18 is disposed on the upper side of the core rubber layer and has a beveled edge 19. In analogous manner, bottom rubber covering layer 22 is disposed on the lower side of the core rubber layer and has a beveled edge 23.

Figure 2:
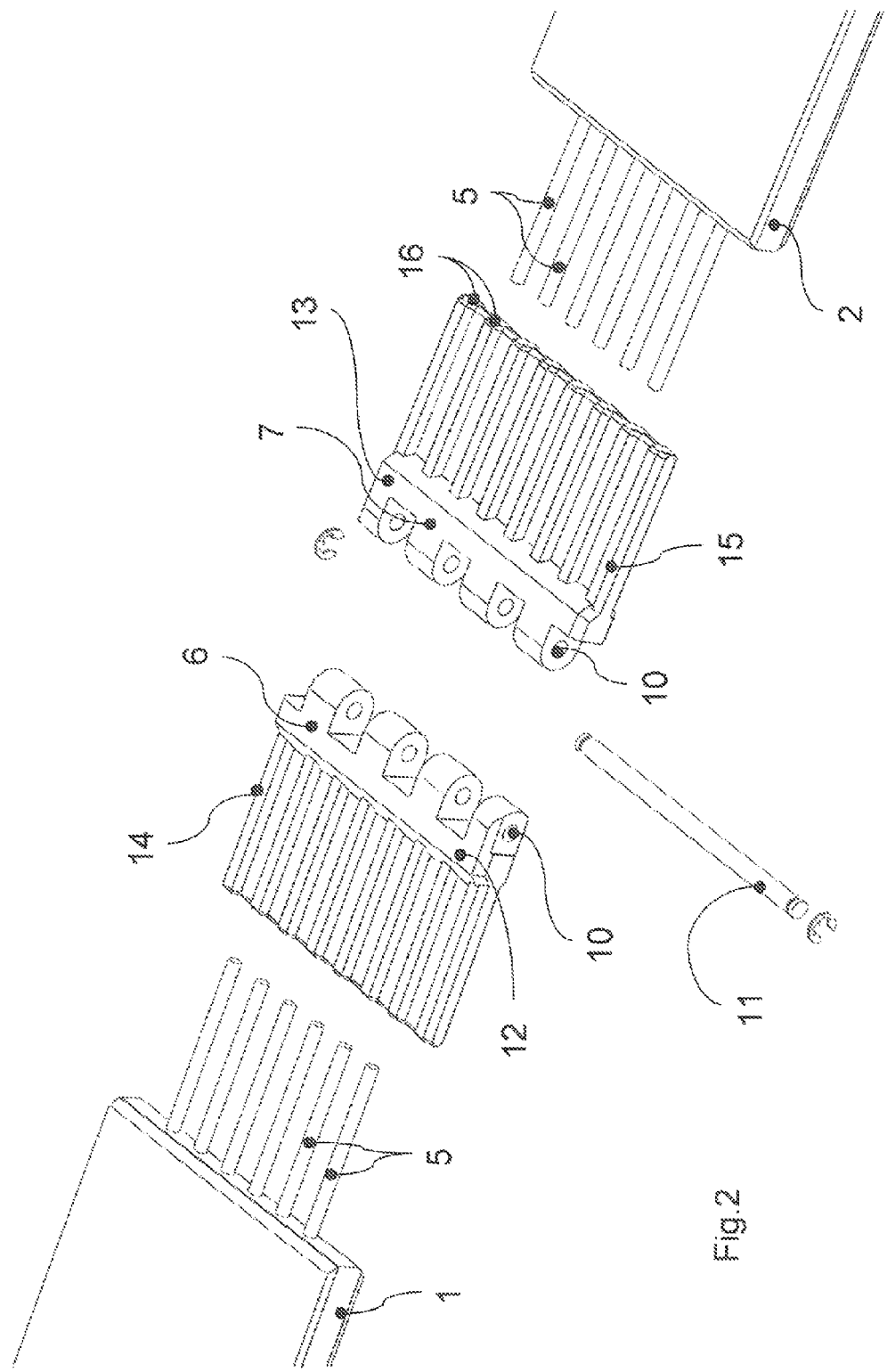
FIG. 2 shows the hinge connection illustrated in FIG. 1 in the disengaged state; and, FIG. 3 shows the hinge connection in a transparent illustration to clarify the embedded parallel steel cords.

The uncovered ends of the steel cords 5 are inserted into longitudinal bores 16 of the hinge plate 15 and these longitudinal bores run in the direction of the steel cords of the belt 3. To produce the connection between the belt end 2 and hinge plate 15, the steel cords 5 are exposed over the length of the designated connection and are fitted into the longitudinal bores 16 of the hinge plate 15. As shown in FIG. 2, each hinge plate (14, 15) has a corrugated surface with ridges and grooves. The longitudinal bores 16 are arranged only at ridges or raised portions of the hinge plate. That region of the hinge plate 15 into which the steel cords 5 have been introduced is pressed together by means of a press. A frictional and partial form-fitting connection is produced between the hinge plate 15 and the steel cords 5.

The two part hinges 6 and 7 are combined to form the hinge 4. The tensile forces of the conveyer belt ends 1 and 2 are transmitted by the steel cords 5 via the hinge plates 14 and 15 to the hinge 4.

It is understood that the foregoing description is that of the preferred embodiments of the invention and that various changes and modifications may be made thereto without departing from the spirit and scope of the involution as defined in the appended claims.

LIST OF REFERENCE NUMBERS

Part of the Description

1 Conveyer belt end
2 Conveyer belt end
3 Steel cord conveyer belt
4 Hinge
5 Steel cables; steel cords
6 Part hinge
7 Part hinge
8 Crenellation-type projections
9 Crenellation-type projections
10 Transverse bores
11 Coupling rod
12 Hinge bolt
13 Hinge bolt
14 offset hinge plate
15 offset hinge plate
16 longitudinal bores
18 top rubber covering layer
19 beveled edge
22 bottom rubber covering layer
23 beveled edge

What is claimed is:

1. A conveyor belt defining a longitudinal axis and comprising:
    first and second conveyor belt portions;
    each one of said conveyor belt portions being made of elastomer material and having an upper side and a lower side;
    a reinforcement layer embedded in said elastomer material;
    said reinforcement layer including a plurality of steel cords arranged to be mutually parallel and running in the direction of said longitudinal axis;

each of said conveyor belt portions further including an end section whereat said elastomer material is removed so as to cause said steel cords to be exposed providing a plurality of exposed steel cord end segments;

first and second part hinges assigned to respective ones of the end sections of said conveyor belt portions;

each one of said part hinges including a hinge plate directed toward the conveyor belt portion corresponding thereto;

said hinge plates each having a corrugated surface having alternating ridges and grooves;

said hinge plates each having a plurality of longitudinal bores formed therein at corresponding ones of said ridges to accommodate respective ones of said cord end segments inserted therein;

the hinge plate of each of said part hinges being pressed to fix said cord end segments securely in position in the hinge plate;

the hinge plate of each of said part hinges having a free end;

each one of said first and second part hinges further including a plurality of crenellated projections at the free end of the hinge plate corresponding thereto;

the part hinge corresponding to said first conveyor belt portion being assembleable with the part hinge corresponding to said second conveyor belt portion to conjointly define a hinge connecting said first and second conveyor belt portions to each other; and, wherein the hinge plates are made of metal and are pressed to cause a frictional and form-fitting connection directly between the hinge plate and the steel cord end segments disposed therein.

2. The conveyor belt of claim 1, wherein each part hinge is formed as a single piece.

3. The conveyor belt of claim 1, wherein the crenellated projections of said part hinges define mutually aligned transverse bores; said crenellated projections interdigitally are engaged so as to cause the transverse bores of the crenellated projections of both part hinges to be in alignment; and, a coupling rod extends through the transverse bores to complete said hinge connection.

4. The conveyor belt of claim 3, wherein each part hinge is configured as a single piece.

5. The conveyor belt of claim 1, further comprising:
a top rubber cover layer disposed on said upper side; and,
a bottom rubber cover layer disposed on said lower side.

6. The conveyor belt of claim 5, wherein each of said top rubber cover layer and said bottom cover layer has a beveled edge.

7. The conveyor belt of claim 1, wherein said hinge plate of each of said part hinges is a single hinge plate.

8. The conveyor belt of claim 7, wherein said single hinge plate of each of said part hinges is directed only toward the conveyor belt portion corresponding thereto.

9. A conveyor belt defining a longitudinal axis and comprising:
first and second conveyor belt portions;

each one of said conveyor belt portions being made of elastomer material and having an upper side and a lower side;

a reinforcement layer embedded in said elastomer material;

said reinforcement layer including a plurality of steel cords arranged to be mutually parallel and running in the direction of said longitudinal axis;

each of said conveyor belt portions further including an end section whereat said elastomer material is removed so as to cause said steel cords to be exposed providing a plurality of exposed steel cord end segments;

first and second part hinges assigned to respective ones of the end sections of said conveyor belt portions;

each one of said part hinges including a single hinge plate directed only toward the conveyor belt portion corresponding thereto;

said hinge plates each having a corrugated surface having alternating ridges and grooves;

said hinge plates each having a plurality of longitudinal bores formed therein at corresponding ones of said ridges to accommodate respective ones of said cord end segments inserted therein;

the hinge plate of each of said part hinges being pressed to fix said cord end segments securely in position in the hinge plate;

the hinge plate of each of said part hinges having a free end;

each one of said first and second part hinges further including a plurality of crenellated projections at the free end of the hinge plate corresponding thereto;

the part hinge corresponding to said first conveyor belt portion being assembleable with the part hinge corresponding to said second conveyor belt portion to conjointly define a hinge connecting said first and second conveyor belt portions to each other;

wherein the hinge plates are made of metal and are pressed to cause a frictional and form-fitting connection directly between the hinge plate and the steel cord end segments disposed therein; and, wherein the steel cord end segments disposed in the hinge plates are arranged to be mutually parallel and running in the direction of said longitudinal axis.

* * * * *